(12) United States Patent
Richards

(10) Patent No.: US 8,918,658 B2
(45) Date of Patent: Dec. 23, 2014

(54) SYSTEM AND METHOD FOR AN INTERLEAVED MULTI-STAGE PHASE ARRAY VOLTAGE REGULATOR

(75) Inventor: George Richards, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 573 days.

(21) Appl. No.: 13/226,136

(22) Filed: Sep. 6, 2011

(65) Prior Publication Data

US 2013/0061065 A1    Mar. 7, 2013

(51) Int. Cl.
*G06F 1/26*    (2006.01)

(52) U.S. Cl.
CPC ............................. *G06F 1/26* (2013.01)
USPC .......................... 713/300; 713/320; 713/324

(58) Field of Classification Search
None
See application file for complete search history.

(56) References Cited

U.S. PATENT DOCUMENTS

| | | | |
|---|---|---|---|
| 6,144,194 A | * | 11/2000 | Varga ............................. 323/285 |
| 6,628,101 B2 | | 9/2003 | Dymond et al. |
| 6,894,465 B2 | | 5/2005 | Sutardja et al. |
| 2004/0008016 A1 | * | 1/2004 | Sutardja et al. ............... 323/283 |
| 2004/0233686 A1 | | 11/2004 | Li et al. |
| 2008/0157742 A1 | | 7/2008 | Martin et al. |
| 2011/0188218 A1 | * | 8/2011 | Hsing et al. ................... 361/772 |
| 2012/0176105 A1 | * | 7/2012 | Chang et al. .................. 323/237 |

* cited by examiner

*Primary Examiner* — Paul Yanchus, III
(74) *Attorney, Agent, or Firm* — Baker Botts L.L.P.

(57) ABSTRACT

In accordance with the present disclosure, a system and method for an interleaved, multi-stage phase array voltage regulator is described. The interleaved, multi-stage phase array voltage regulator includes a first phase array with a plurality of first power stages and a second phase array with a plurality of second power stages. The interleaved, multi-stage phase array voltage regulator may also include a voltage control loop that at least partially controls a duty cycle of the first phase array and the second phase array. Also, the interleaved, multi-stage phase array voltage regulator may include a current control loop that at least partially controls which of the plurality of first power stages and second power stages are active.

20 Claims, 4 Drawing Sheets

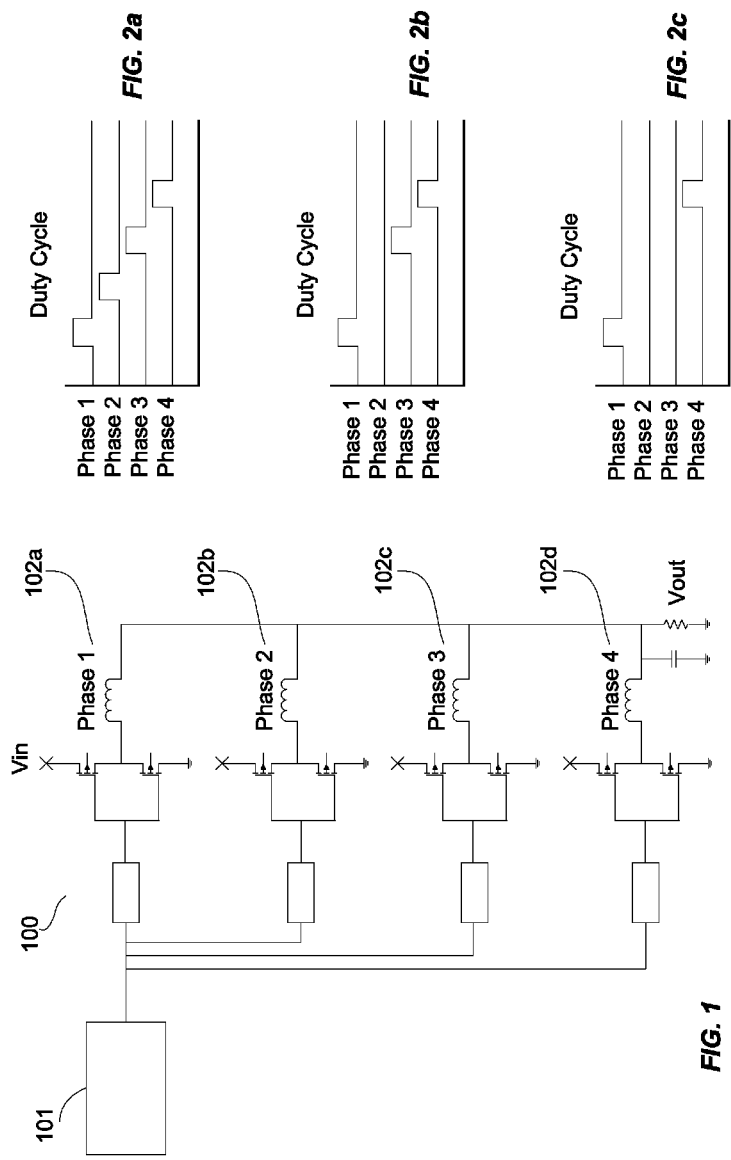

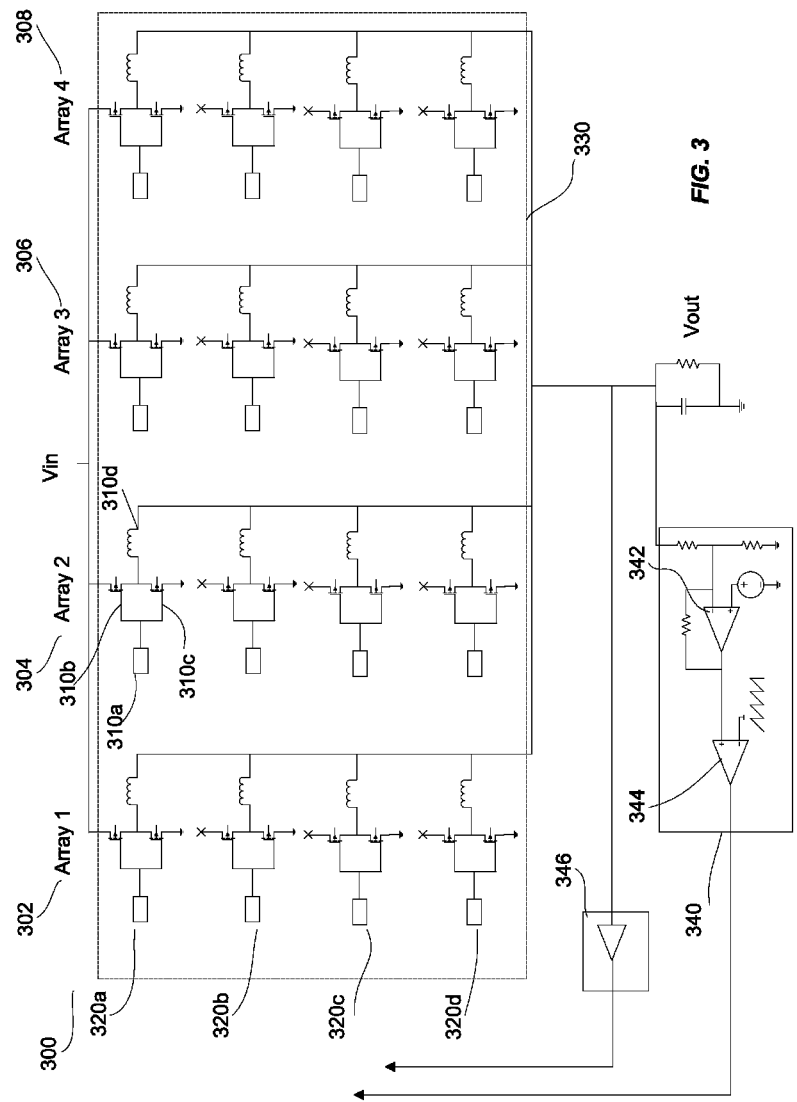

SYSTEM AND METHOD FOR AN INTERLEAVED MULTI-STAGE PHASE ARRAY VOLTAGE REGULATOR

TECHNICAL FIELD

The present disclosure relates generally to the operation of computer systems and information handling systems, and, more particularly, to a system and method for an interleaved multi-stage phase array voltage regulator.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include many different components, including memory, processors, etc., each requiring power to operate. The components are typically powered through at least one voltage regulator (VR) which outputs power at a pre-determined voltage level. Operating conditions in the information handling system may dictate the need for more or less power, and the voltage regulator may change output power in response to system requirements. Increasing or decreasing the output power in existing voltage regulators, however, is problematic. For instance, in phased VRs, decreasing the output power requires shedding at least one phase of the VR, which causes discontinuities or ripples in the output voltage and delays the time it takes the VR to provide the necessary output power at the pre-determined voltage level. These delays decrease the speed and efficiency of the information handling system because the components must generally wait to accomplish tasks until the VR output has stabilized at the pre-determined voltage level.

SUMMARY

In accordance with the present disclosure, a system and method for an interleaved, multi-stage phase array voltage regulator is described. The interleaved, multi-stage phase array voltage regulator includes a first phase array with a plurality of first power stages and a second phase array with a plurality of second power stages. The interleaved, multi-stage phase array voltage regulator may also include a voltage control loop that at least partially controls a duty cycle of the first phase array and the second phase array. Also, the interleaved, multi-stage phase array voltage regulator may include a current control loop that at least partially controls which of the plurality of first power stages and second power stages are active.

In other embodiments, the system and method described herein may include activating a number of power stages in a first phase array and a second phase array. The system and method may further include generating a duty cycle. The duty cycle may cause the active power stages in the first phase array and the second phase array to output current. Additionally, the system and method may include altering the number of active power stages in the first phase array and the second phase array based, at least in part, on an amount of current required by a load.

The system and method disclosed herein is technically advantageous because it provides for near linear control out output current in a phased voltage regulator. Because phase arrays in the voltage regulator described herein need not be shed to reduce output power, the output power signal avoids the asymmetries and ripples that exist in current phased voltage regulators. Additionally, an interleaved multi-stage phase array voltage regulator as described herein is advantageous because it allows for increased flexibility and control in the design and implementation of phased voltage regulators. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is an example of an existing 4-phase voltage regulator.

FIGS. 2a-c are example duty cycles of an existing 4-phase voltage regulator, where the voltage regulator sheds phases to reduce output power.

FIG. 3 is an example interleaved multi-stage phase array voltage regulator according to aspects of the present disclosure.

DETAILED DESCRIPTION

Figure 4:
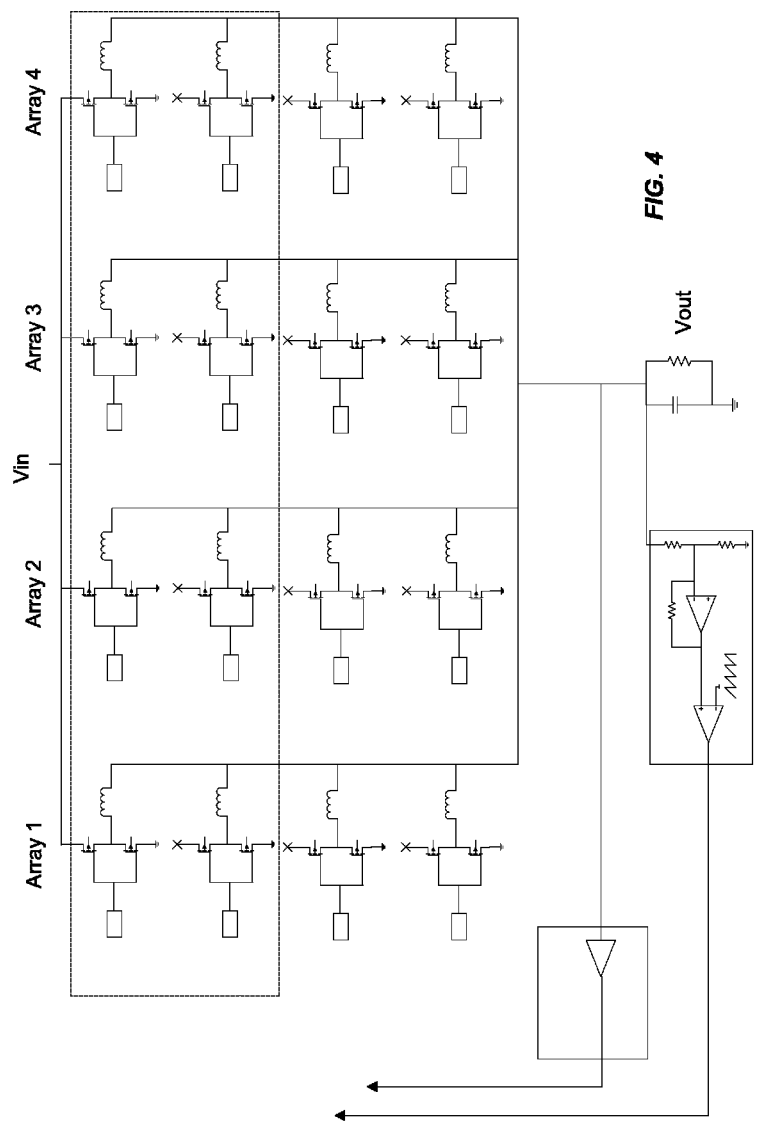
FIG. 4 is an example interleaved multi-stage phase array voltage regulator according to aspects of the present disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Shown in FIG. 1 is an example existing four phase VR 100. The VR 100 includes a VR controller 101 attached to four phase circuits 102a-d. The VR controller 101 may output a control signal to each of the phase circuits 102a-d. Each phase circuit receives the signal and outputs a predetermined amount of current, such as 25-30 amperes, at the voltage level of the voltage regulator. The current then flows to the load, Vout, powering electronic equipment.

The VR controller 101 cycles on the phase circuits 102a-d based on the amount of power required by the load. If maximum power is required, the VR controller 101 cycles on each of the phase circuits 102a-d in succession, as can be seen in FIG. 2a, such that a substantially consistent amount of power is output by the VR 100. When the load requires less that the maximum amount of power, the VR controller 101 skips a phase circuit in the duty cycle, also known as phase shedding, as can be seen in FIGS. 2b and 2c. When the VR controller sheds phases, it skips one of the phase circuits in the duty cycle succession, creating an asymmetry or ripple in the output power. For example, in FIG. 2b, phase circuit 102b is skipped, leading to a drop in the power supplied to the load due to the gap in time between when the phases are conducting. In FIG. 2c, the drop may be more severe, as the VR 100 goes a longer period of time without a phase circuit outputting power. The drop in power output by the VR 100 may, for example, increase wait times for computer processes because computer components may suspend operations until a predetermined power level is reached.

Shown in FIG. 3 is an interleaved multi-stage phase array VR 300, incorporating aspects of the present disclosure. The VR 300 includes phase arrays 302, 304, 306, and 308. Although four phase arrays are shown in the present example, an interleaved multi-stage phase array VR is not limited to four phases. Each phase array may include an array of power stages arranged in parallel, such as power stages 320a-d in phase array 302. The number of power stages shown in FIG. 3 should not be seen as limiting the number of power stages that can be included in a phase array.

In certain embodiments, each power stage of each phase array may include similar architecture. For example, each power stage may include a gate driver 310a, a high-side field effect transistor ("FET") 310b, a low-side FET 310c, and a output filter inductor 310d. Each power stage may receive the same input voltage signal Vin and output a substantially similar pre-determined current, such as 2, 3, 5, 10, etc. amperes. Each phase array may output a maximum current similar to the 25-30 amperes output by each phase in FIG. 1. As will be appreciated by one of ordinary skill in the art with the benefit of this disclosure, the actual current output of each power stage may vary slightly due to component tolerances.

In certain embodiments, some or all of the power stages may be implemented as discrete components. The output power level of each power stage relative to the input voltage may be controlled through the selection of package transistors, as will appreciated by one of ordinary skill in the art in view of this disclosure. The number of discrete components required for a particular phase array may be determined by first determining a maximum output power level for the phase array and then dividing the maximum output power level of the power stage.

Each of the phase arrays 302, 304, 306, and 308 may output power in parallel to the load. The interleaved, multi-stage phase array VR 300 may further include voltage control loop circuitry 310 connected to the output of the phase arrays 302, 304, 306, and 308. In the embodiment shown in FIG. 3, an inverting amplifier 342 of the voltage control loop circuitry 340 may receive as inputs a measurement of the output from the interleaved, multi-stage phase array VR 300 and a reference voltage. The output of inverting amplifier 342 may be input into comparator 344 along with a ramp voltage signal. The comparator 344 may then output the result of the comparison to the phase arrays as the duty cycle. Unlike the VR controller 101, the voltage control loop circuitry does not shed phases to reduce power output. Instead, the voltage control loop circuitry 340 outputs a duty cycle, such as the duty cycle shown in FIG. 5, triggering each of the phase arrays even when less that full output is required. By triggering each phase array, the voltage control loop circuitry 340 of the interleaved, multi-stage phase array VR 300 avoids the asymmetries and ripples present in existing phased VRs.

In addition to the voltage control loop circuitry 340 the interleaved, multi-stage phase array VR 300 may also include current control loop circuitry 346. The current control loop circuitry 346 may receive as an input a measurement of the output provided by the interleaved, multi-stage phase array VR 300. For example, the measurement might include the output power, the output current, or the output voltage. The current control loop circuitry 346 may output a load current to each of the active power stages in arrays 302, 304, 306, and 308. If the power draw by the load passes a predetermined threshold value, as indicated by a voltage or current change, the current control loop circuitry 346 may respond by increasing or decreasing the load current to activate or deactivate power stages of the phase arrays. The current control loop circuitry 346 may include more than one predetermined threshold ranges, and each predetermined threshold range may have a corresponding number of power stages. For example, the highest threshold range may require that each power stage in the phase arrays be activated to provide the necessary power to the load, as is shown in FIG. 3 by box 330. In contrast, an intermediate threshold range may, for example, require 50% of the power stages be active, as is illustrated in FIG. 4.

Figure 5:
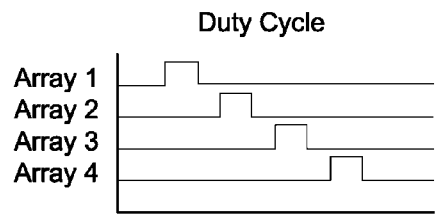
FIG. 5 is an example duty cycle for an interleaved multi-stage phase array voltage regulator according to aspects of the present disclosure.

If a gate driver of a power stage receives a positive duty cycle signal, and the power stage receives the load current from the current sense loop circuitry, the power stage may conduct current to the load. Each active power stage within a phase array that is cycled on may output current simultaneously. This configuration is beneficial in that reducing the power level does not require shedding one of the phases. Instead, as can be seen in FIG. 5, each phase array is cycled on, regardless the required output power—the number of active power stages may be varied to alter the current output of the VR 300.

Figure 6:
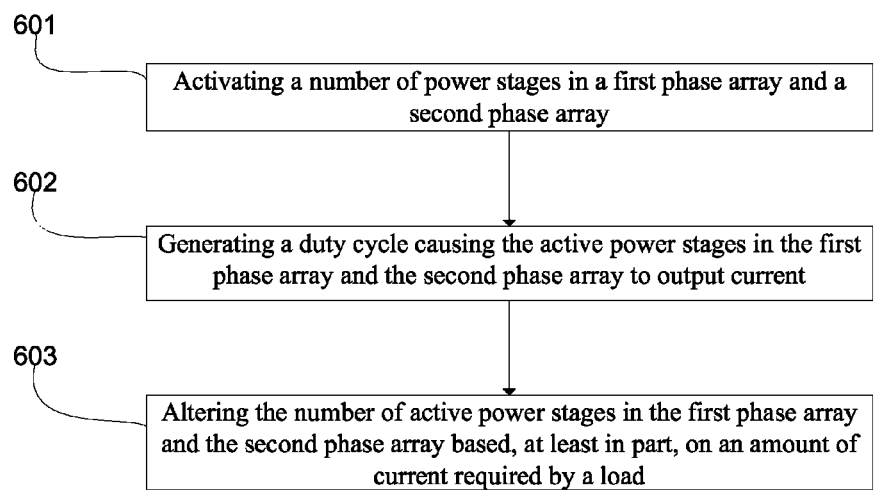
FIG. 6 is an example method incorporating aspects of the present invention.

FIG. 6 illustrates an example method incorporating aspects of the present invention. Step 601 includes activating a number of power stages in a first phase array and a second phase array. The first phase array and the second phase array may include a similar number of power stages. Each of the power stages may comprises similar circuitry, such as a gate driver, FETs, and inductors. Activating a number of power stages may include outputting a load current from a current control loop circuitry, such as current control loop circuitry 346 in FIG. 3. The number of power stages activated may be determined, in part, based on the current requirements of the load attached to an interleaved, multi-stage voltage regulator, such as the interleaved, multi-stage voltage regulator 300 in FIG. 3.

Step 602 includes generating a duty cycle causing the active power stages in the first phase array and the second phase array to output current. The duty cycle may be generated by a voltage control loop circuitry, such as the voltage control loop circuitry 340 in FIG. 3. The voltage control loop circuitry may transmit the duty cycle to each power stage of the first phase array and the second phase array. Further, the duty cycle may be output to each phase array regardless the power requirements of an attached load.

Step 603 may include altering the number of active power stages in the first phase array and the second phase array based, at least in part, on an amount of current required by the load. The number of active power stages may be altered by a current control loop circuitry, such as the current control loop circuitry 346 in FIG. 3. The current control loop circuitry may alter the number of active power stages by changing a load current output to each of the power stages in the system. If more power is required by an attached load, the current control loop may increase the load current, activating more power stages. If less power is required by an attached load, the current control loop circuitry may output less load current, decreasing the number of active power stages. In each case, however, the duty cycle may trigger each phase array to output power, avoiding the discontinuities in the output power seen in the 4-phase array of FIG. 1.

Although the present disclosure has been described in detail, it should be understood that various changes, substitutions, and alterations can be made hereto without departing from the spirit and the scope of the invention as defined by the appended claims.

What is claimed is:

1. An interleaved, multi-stage phase array voltage regulator, comprising:
   a first phase array, wherein the first phase array includes a plurality of first power stages;
   a second phase array, wherein the second phase array includes a plurality of second power stages;
   a voltage control loop, wherein the voltage control loop at least partially controls a duty cycle of the first phase array and the second phase array, and wherein the duty cycle is controlled so as to trigger each of the first phase array and the second phase array even when less than full output is required; and
   a current control loop, wherein the current control loop at least partially controls which of the plurality of first power stages and second power stages are active.

2. The interleaved, multi-stage phase array voltage regulator of claim 1, wherein the amount of active power stages in the plurality of first power stages and the plurality of second power stages is equal.

3. The interleaved, multi-stage phase array voltage regulator of claim 2, wherein each power stage in the plurality of first power stages and second power stages outputs a substantially similar amount of current.

4. The interleaved, multi-stage phase array voltage regulator of claim 3, wherein the current control loop is further operable to alter which of the plurality of first power stages and second power stages are active based at least in part on a current required by a load.

5. The interleaved, multi-stage phase array voltage regulator of claim 1, wherein the first phase array and the second phase array output a substantially similar maximum current.

6. The interleaved, multi-stage phase array voltage regulator of claim 5, wherein the maximum current is between 25 and 30 amperes.

7. The interleaved, multi-stage phase array voltage regulator of claim 1, wherein each of the power stages of the first phase array and the second phase array includes a gate driver, a transistor, and an inductor.

8. The interleaved, multi-stage phase array voltage regulator of claim 1, wherein each of the power stages of the first phase array and the second phase array includes a gate driver, a high-side field effect transistor (FET), a low-side FET, and an output filter inductor.

9. The interleaved, multi-stage phase array voltage regulator of claim 7, wherein the gate driver receives an input from both the voltage control loop and the current control loop.

10. A method for regulating voltage in a computer system comprising:
    activating a number of power stages in a first phase array and a second phase array;
    generating a duty cycle causing the active power stages in the first phase array and the second phase array to output current, wherein the duty cycle is generated so as to trigger each of the first phase array and second phase array even when less than full output is required;
    altering the number of active power stages in the first phase array and the second phase array based, at least in part, on an amount of current required by a load.

11. The method of claim 10, wherein the number of active power stages in the first phase array and the second phase array is equal.

12. The method of claim 10, wherein each of the power stages outputs a substantially similar amount of current.

13. The method claim 10, wherein activating a number of power stages in a first phase array and a second phase array includes outputting a load current from current control loop circuitry.

14. The method of claim 10, wherein the first phase array and the second phase array each output between 25 and 30 amperes.

15. The method of claim 10, wherein the duty cycle is generated by voltage control loop circuitry.

16. The method of claim 15, wherein the duty cycle does not depend on the power requirements of an attached load.

17. The method of claim 10, wherein each of the power stages includes a gate driver, a high-side field effect transistor (FET), a low-side FET, and an output filter inductor.

18. A method for regulating voltage in a computer system, comprising:
    providing a first phase array, wherein the first phase array includes a plurality of first power stages;
    providing a second phase array, wherein the second phase array includes a plurality of second power stages;
    providing a voltage control loop, wherein the voltage control loop at least partially controls a duty cycle of the first phase array and the second phase array, and wherein the duty cycles is controlled so as to trigger each of the first phase array and second phase array even when less than full output is required; and providing a current control loop, wherein the current control loop at least partially controls which of the plurality of first power stages and second power stages are active.

19. The method of claim 18, wherein each power stage in the plurality of first power stages and second power stages outputs a substantially similar amount of current.

20. The method of claim 19, wherein the current control loop alters which of the plurality of first power stages and second power stages are active based at least in part on a current required by a load.

\* \* \* \* \*